United States Patent
Nagano

(10) Patent No.: US 9,792,666 B2
(45) Date of Patent: Oct. 17, 2017

(54) IMAGE PROCESSING DEVICE, IMAGE DISPLAY DEVICE, AND METHOD OF CONTROLLING IMAGE PROCESSING DEVICE FOR REDUCING AND ENLARGING AN IMAGE SIZE

(71) Applicant: SEIKO EPSON CORPORATION, Tokyo (JP)

(72) Inventor: Miki Nagano, Shiojiri-shi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 64 days.

(21) Appl. No.: 14/313,124

(22) Filed: Jun. 24, 2014

(65) Prior Publication Data
US 2015/0002551 A1    Jan. 1, 2015

(30) Foreign Application Priority Data
Jun. 27, 2013   (JP) ................. 2013-134628

(51) Int. Cl.
*G06T 3/40* (2006.01)
*G09G 3/36* (2006.01)
(Continued)

(52) U.S. Cl.
CPC .............. *G06T 3/40* (2013.01); *G09G 3/003* (2013.01); *G09G 5/005* (2013.01); *H04N 9/3188* (2013.01); *G09G 3/36* (2013.01); *G09G 2320/0613* (2013.01); *G09G 2320/08* (2013.01); *G09G 2340/04* (2013.01); *G09G 2340/045* (2013.01); *G09G 2340/0407* (2013.01); *G09G 2340/0435* (2013.01); *G09G 2360/18* (2013.01); *G09G 2370/20* (2013.01)

(58) Field of Classification Search
CPC ........................................................ G06T 1/60
USPC ....................... 345/667, 419, 545; 348/14.13
See application file for complete search history.

(56) References Cited

U.S. PATENT DOCUMENTS

2008/0072261 A1* 3/2008 Ralston ................ G11B 27/034
                                                                725/62
2008/0272994 A1   11/2008 Chen et al.
(Continued)

FOREIGN PATENT DOCUMENTS

JP    2000-278519 A    10/2000
JP    2009-044438 A     2/2009
(Continued)

*Primary Examiner* — Kee M Tung
*Assistant Examiner* — Yanna Wu
(74) *Attorney, Agent, or Firm* — Oliff PLC

(57) ABSTRACT

An image processing device adapted to perform image processing on image information input, and then output the image information includes a first image processing section adapted to perform image processing on the image information, and include a first storage section to store the image information, and a second image processing section adapted to perform image processing on the image information from the first image processing section, and include a second storage section to store the image information. The first image processing section performs a process of reducing an image size of the image information stored in the first storage section and raising a refresh rate, and the second image processing section performs a process of enlarging an image size of the image information stored in the second storage section.

9 Claims, 4 Drawing Sheets

(51) Int. Cl.
 *G09G 5/393* (2006.01)
 *G09G 3/00* (2006.01)
 *G09G 5/00* (2006.01)
 *H04N 9/31* (2006.01)

(56) References Cited

U.S. PATENT DOCUMENTS

| | | |
|---|---|---|
| 2009/0185082 A1 | 7/2009 | Hashimoto |
| 2010/0103485 A1 | 4/2010 | Haussler |
| 2010/0149139 A1 | 6/2010 | Kroll et al. |
| 2010/0149311 A1 | 6/2010 | Kroll et al. |
| 2010/0149312 A1 | 6/2010 | Schwerdtner |
| 2010/0149314 A1 | 6/2010 | Schwerdtner et al. |
| 2010/0149609 A1 | 6/2010 | Schwerdtner |
| 2010/0149610 A1 | 6/2010 | Schwerdtner et al. |
| 2010/0157399 A1 | 6/2010 | Kroll et al. |
| 2010/0253677 A1 | 10/2010 | Kroll et al. |
| 2010/0290706 A1* | 11/2010 | Wang .................. G06F 3/04883 382/188 |
| 2011/0032235 A1 | 2/2011 | Nose |
| 2011/0069225 A1* | 3/2011 | Routhier ................ H04N 7/122 348/443 |
| 2011/0149018 A1 | 6/2011 | Kroll et al. |
| 2012/0019612 A1* | 1/2012 | Choudury .......... H04N 13/0011 348/36 |
| 2013/0177292 A1* | 7/2013 | Leichsenring ....... G11B 27/322 386/230 |
| 2013/0250049 A1 | 9/2013 | Schwerdtner |
| 2014/0028779 A1* | 1/2014 | Minemura ............. H04N 7/147 348/14.02 |
| 2014/0321555 A1* | 10/2014 | Rossato ................ H04N 19/46 375/240.26 |

FOREIGN PATENT DOCUMENTS

| | | |
|---|---|---|
| JP | A-2011-39256 | 2/2011 |
| JP | A-2011-504238 | 2/2011 |
| TW | 200844935 A | 11/2008 |
| WO | WO 2008/138984 A2 | 11/2008 |

* cited by examiner

| VIDEO INPUT TERMINAL (SOURCE TYPE) | SET MODE |
|---|---|
| ANALOG RGB | SECOND MODE (FINE MODE) |
| COMPONENT VIDEO | SECOND MODE (FINE MODE) |
| COMPOSITE VIDEO | SECOND MODE (FINE MODE) |
| D-VIDEO | FIRST MODE (FAST MODE) |
| HDMI | FIRST MODE (FAST MODE) |

IMAGE PROCESSING DEVICE, IMAGE DISPLAY DEVICE, AND METHOD OF CONTROLLING IMAGE PROCESSING DEVICE FOR REDUCING AND ENLARGING AN IMAGE SIZE

The entire disclosure of Japanese Patent Application No. 2013-134628, filed Jun. 27, 2013, is expressly incorporated by reference herein.

BACKGROUND

1. Technical Field

The present invention relates to an image processing device, an image display device, and a method of controlling an image processing device.

2. Related Art

In the past, there has been known a display device for performing double speed display. In JP-A-2011-39256 (Document 1), there is disclosed a display device, which performs double speed processing on image data to generate double-speed processed image data, then compresses (encodes) the double-speed processed image data to generate compressed image data, and then transfers the compressed image data to a driver in the case in which the driver for driving a display panel performs the double speed display. Further, the driver of the display device expands (decodes) the compressed image data to decompress the double-speed processed image data, and then drives the display panel in response to the decompressed double-speed processed image data. According to such a display device as described above, the amount of data transferred in the display device is reduced to thereby make it possible to reduce the necessity of high-speed data transfer.

However, in the display device described in Document 1, in the case of performing the double speed processing, it is necessary to compress the image data to transfer the image data to the driver, and then expand the image data by the driver to drive the display panel. As described above, since the image data is compressed (encoded) in the format requiring the expansion (decode), it is difficult to perform image processing with the data in the compressed state. For example, in the case of performing the image processing such as a keystone distortion correction, there is required a processing circuit for expanding (decoding) the compressed data before inputting the compressed data to the image processing circuit.

In recent years, there has been known an image processing device provided with a plurality of image processing circuits such as a circuit for the double speed display, a circuit for the keystone distortion correction, and a circuit for noise reduction. In such an image processing device as described above, there has been known a device, which writes the image data into a frame memory incorporated in the image processing circuit to perform the image processing without compressing (encoding) and expanding (decoding) the image data. However, if the image data is once written into the frame memory, there occurs an image delay time (a frame delay) as much as one frame. When performing such image processing a plurality of times, the delay time corresponding to the image processing occurs. When the frame delay occurs, there is a problem that a delay occurs when the image output from the image display device follows the operation of the controller by the user in the case in which the image display device displays the image such as a video game requiring real-time processing as an important factor. In the case in which the frame delay is large, the nature of the game is spoiled in the case in which the operation of the user fails to be reflected on the display despite the operation of the user due to the delay of the image processing.

Further, although it is possible to shorten the image delay time (the frame delay) by speeding up writing/reading of the image data into the frame memory of the image processing circuit, in order for speeding up the writing/reading, a measure such as increase in the clock rate or expansion of the bus width becomes necessary. In this case, speeding up of the devices or expansion of the wiring area is required, and there is a problem that the manufacturing cost rises.

SUMMARY

An advantage of some aspects of the invention is to solve at least a part of the problems described above, and an aspect of the invention can be implemented as the following forms or application examples.

APPLICATION EXAMPLE 1

This application example is directed to an image processing device adapted to perform image processing on image information input, and then output the image information, and including a first image processing section adapted to perform image processing on the image information, and include a first storage section to store the image information, and a second image processing section adapted to perform image processing on the image information from the first image processing section, and include a second storage section to store the image information, wherein the first image processing section performs a process of reducing an image size of the image information stored in the first storage section and raising a refresh rate, and the second image processing section performs a process of enlarging an image size of the image information stored in the second storage section.

According to such an image processing device as described above, the first image processing section and the second processing section respectively have the first storage section and the second storage section each for storing the image information. Further, the first image processing section performs the process of reducing the image size of the image information and raising the refresh rate (also referred to as a "frame rate"), and the second image processing section performs the process of enlarging the image size of the image information. Thus, since the first image processing section writes the image information in the storage section (hereinafter also referred to as a "frame memory"), reduces the image size and raises the refresh rate, it becomes possible to reduce the image delay time (the frame delay) in the process performed thereafter. Further, the second image processing section enlarges the image size having been contracted. Therefore, it becomes possible to restore the image size at input.

APPLICATION EXAMPLE 2

This application example is directed to the image processing device according to the application example described above, wherein the image processing device further includes a control section adapted to switch between a first mode for performing a process of reducing the image size of the image information and raising the refresh rate of the image information by the first image processing section, and a process of enlarging the image size of the image information by the second image processing section, and a second mode for keeping the image size and the refresh rate of the image information in the first image processing section, and keeping the image size of the image information also in the second image processing section.

According to such an image processing device as described above, the control section switches between the first mode for performing the process of reducing the image size of the image information and raising the refresh rate by the first image processing section, and the process of enlarging the image size of the image information by the second image processing section, and the second mode for keeping the image size and the refresh rate of the image information in the first image processing section, and keeping the image size of the image information also in the second image processing section. Thus, the control section can switch between the first mode for reducing the image delay time, and the second mode for preventing the degradation of the image quality due to the contraction of the image size.

APPLICATION EXAMPLE 3

This application example is directed to the image processing device according to the application example described above, wherein the image processing device further includes a plurality of image input terminals, a mode storage section adapted to store mode correspondence information indicating a correspondence between at least one of the image input terminals and one of the first mode and the second mode, and an image terminal selection section adapted to select one of the image input terminals, and the control section selects one of the first mode and the second mode based on information of the image input terminal selected by the image terminal selection section, and the mode correspondence information stored in the mode storage section.

According to such an image processing device, the mode storage section stores the correspondence between each of the image input terminals and either one of the first mode and the second mode. The control section selects either one of the first mode and the second mode to switch between the first mode and the second mode based on the image input terminal thus selected and the mode correspondence information. Thus, it becomes possible to switch between the first mode for reducing the image delay time, and the second mode for preventing the degradation of the image quality in accordance with the image input terminal thus selected.

APPLICATION EXAMPLE 4

This application example is directed to the image processing device according to the application example described above, wherein, in the case in which the image information input thereto is 3D-image information, the control section performs switching to the second mode.

According to such an image processing device as described above, in the case in which the image information input is 3D-image information, the control section performs switching to the second mode. Thus, it becomes possible to avoid potential image quality deterioration caused by a 3D-image system.

APPLICATION EXAMPLE 5

This application example is directed to the image processing device according to the application example described above, wherein, in the case in which the image information input is 3D-image information, the second image processing section performs a process of raising the refresh rate of the image information input to the second image processing section, and then outputs the image information.

According to such an image processing device as described above, in the case in which the image information input is 3D-image information, the second image processing section raises the refresh rate of the image information to be output. Thus, it is possible to inhibit the brightness of the viewed image from decreasing when the user views the 3D-image using a pair of 3D-active shutter glasses.

APPLICATION EXAMPLE 6

This application example is directed to an image display device including the image processing device according to the application example described above, and a display section adapted to display an image based on the image information processed by the image processing device.

According to such an image display device, the first image processing section of the image processing device writes the image information in the frame memory to reduce the image size and raise the refresh rate. Further, the second image processing section of the image processing device enlarges the image size having been contracted. Then, the display section performs display of the image information having been processed by the image processing device. Therefore, it becomes possible for the image display device to reduce the image delay time (the frame delay).

APPLICATION EXAMPLE 7

This application example is directed to a method of controlling an image processing device including a first image processing section adapted to perform image processing on the image information, and include a first storage section to store the image information, and a second image processing section adapted to perform image processing on the image information from the first image processing section, and include a second storage section to store the image information, and adapted to perform image processing on image information input, and then output the image information. The method includes reducing an image size of the image information stored in the first storage section and raising a refresh rate by the first image processing section, and enlarging an image size of the image information stored in the second storage section by the second image processing section.

According to such a method of controlling an image processing device as described above, the first image processing section writes the image information in the frame memory to reduce the image size and raise the refresh rate. Further, the second image processing section enlarges the image size having been contracted. Therefore, it becomes possible for the image processing device to reduce the image delay time (the frame delay).

Further, in the case in which the image processing device, the image display device, and the method of controlling an image processing device described above are configured using a computer provided to the image processing device, the aspects and the application examples of the invention described above can be configured as aspects of a program for realizing the function, or a recording medium recording the program in a computer readable manner. As such a recording medium, there can be used various media which can be read by the computer described above such as a flexible disk, a hard disk drive (HDD), a compact disk read only memory (CD-ROM), a digital versatile disk (DVD), a Blu-ray (registered trademark) disc, a magneto optical disk, a nonvolatile memory card, an internal storage device (a semiconductor memory such as a random access memory (RAM) or a read only memory (ROM)) of the image processing device, or an external storage device (e.g., a universal serial bus (USB) memory).

BRIEF DESCRIPTION OF THE DRAWINGS

The invention will be described with reference to the accompanying drawings, wherein like numbers reference like elements.

FIGS. 4A and 4B are explanatory diagrams of scaling performed by a scaler, wherein FIG. 4A is an explanatory diagram of a scale-down process, and FIG. 4B is an explanatory diagram of a scale-up process.

DESCRIPTION OF AN EXEMPLARY EMBODIMENT

Embodiment

Hereinafter, as an image display device having an image processing device according to an embodiment of the invention, a projector for modulating light emitted from a light source based on image information (an image signal), and then projecting the light thus modulated to an external screen or the like to thereby display an image will be explained with reference to the accompanying drawings.

Figure 1:
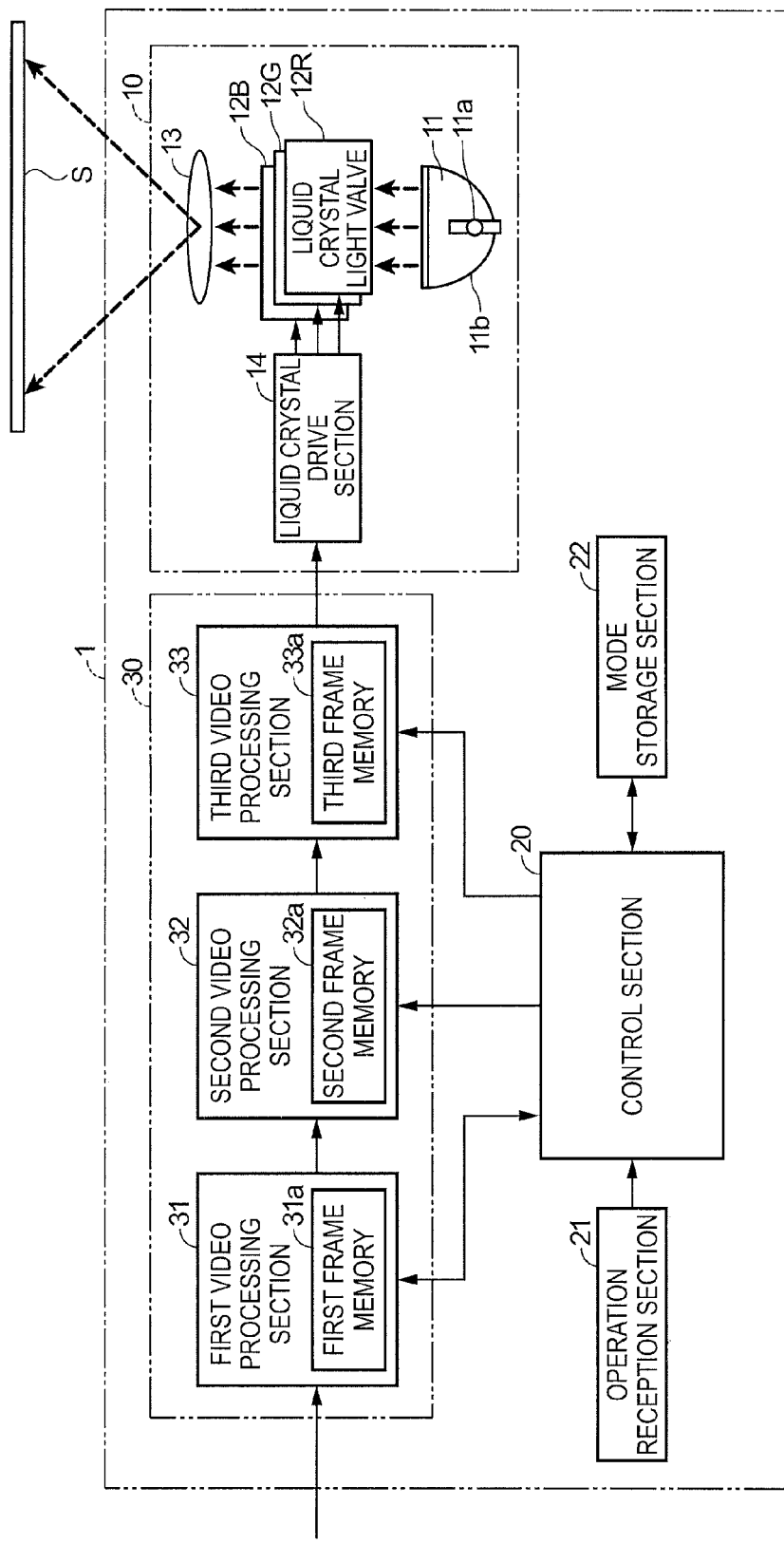
FIG. 1 is a block diagram showing a schematic configuration of a projector according to an embodiment of the invention.

FIG. 1 is a block diagram showing a schematic configuration of the projector according to the present embodiment. As shown in FIG. 1, the projector 1 is provided with an image projection section 10 as a display section, a control section 20, an operation reception section 21, a mode storage section 22, a video processing section 30 as an image processing device, and so on.

The image projection section 10 is constituted by a light source device 11 as alight source, three liquid crystal light valves 12R, 12G, and 12B as a light modulation device, a projection lens 13 as a projection optical system, a liquid crystal drive section 14, and so on. The image projection section 10 modulates the light emitted from the light source device 11 into the image light with the liquid crystal light valves 12R, 12G, and 12B, and then projects the image light from the projection lens 13 to thereby display the image on the projection surface S.

The light source device 11 is configured including a discharge light source lamp 11a formed of, for example, a super-high pressure mercury lamp or a metal halide lamp, and a reflector 11b for reflecting the light, which is emitted by the light source lamp 11a, toward the liquid crystal light valves 12R, 12G, and 12B. The light emitted from the light source device 11 is converted into light having a substantially even intensity distribution by an integrator optical system not shown, and is separated into colored light components of red (R), green (G), and blue (B), the three primary colors of light, by a color separation optical system not shown, and then the colored light components enter the liquid crystal light valves 12R, 12G, and 12B, respectively.

The liquid crystal light valves 12R, 12G, and 12B are each formed of a liquid crystal panel having a liquid crystal material encapsulated between a pair of transparent substrates, and so on. The liquid crystal light valves 12R, 12G, and 12B are each provided with a pixel area having a rectangular shape with a plurality of pixels (not shown) arranged in a matrix, and are arranged so that a drive voltage can be applied to the liquid crystal material pixel by pixel. When the liquid crystal drive section 14 applies the drive voltage corresponding to the image information input thereto to each of the pixels, each of the pixels is set to have a light transmittance corresponding to the image information. Therefore, the light emitted from the light source device 11 is modulated while being transmitted through the pixel areas of the liquid crystal light valves 12R, 12G, and 12B, and thus the image light beams corresponding to the image information are formed for the respective colored light beams. The image light beams of the respective colors are combined by a color combining optical system not shown pixel by pixel to be formed as color image light, and then projected in an enlarged manner by the projection lens 13.

The control section 20 is provided with a central processing unit (CPU), a RAM used for temporarily storing various data and so on, a ROM having a nonvolatile property, and so on. The control section 20 performs the overall control of the operation of the projector 1 due to the CPU operating with a control program stored in the ROM. In other words, the control section 20 functions as a computer.

The operation reception section 21 is provided with a plurality of operation keys for the user to provide a variety of instructions to the projector 1. As the operation keys provided to the operation reception section 21 of the present embodiment, there can be cited, for example, a power key for switching ON/OFF of the power, an input switching key for switching between the video signals input, a menu key for displaying a menu screen for performing a variety of settings, direction keys used for selecting items in the menu screen, and a determination key for determining the item thus selected.

When the user operates the various operation keys of the operation reception section 21, the operation reception section 21 receives the operation and then outputs a control signal corresponding to the operation key thus operated to the control section 20. Then, when the control signal is input from the operation reception section 21, the control section 20 performs the process based on the control signal thus input to thereby control the operation of the projector 1. It should be noted that it is also possible to adopt a configuration of using a remote controller (not shown) capable of a remote operation as an input operation section instead of or together with the operation reception section 21. In this case, the remote controller transmits an operation signal on an infrared ray or the like corresponding to the content of the operation by the user, and then a remote control signal receiving section not shown receives the operation signal and transmits the operation signal to the control section 20.

The mode storage section 22 is configured including a nonvolatile memory. The mode storage section 22 stores information for making plurality of video input terminals (not shown) provided to the projector 1 correspond to either one of a first mode (a fast mode) and a second mode (a fine mode) for each of the video input terminals. The information corresponds to mode correspondence information indicating a correspondence between at least one of the image input terminals and one of the first mode and the second mode. Further, information representing a mode presently set to the projector 1 is also stored in the mode storage section 22.

Here, the first mode (the fast mode) and the second mode (the fine mode) will be explained. It should be noted that in the following explanation, the first mode and the second mode are also referred to collectively as "operation modes." Further, the present operation mode set to the projector 1 is also referred to as a "set mode."

Figures 2, 3:
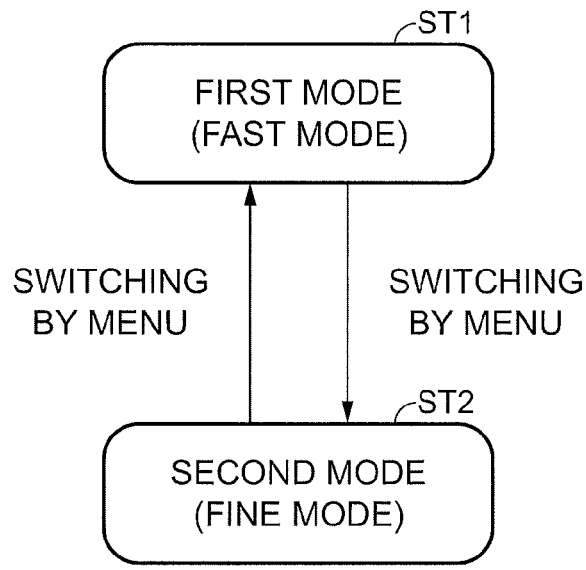
FIG. 2 is a state transition diagram between a first mode and a second mode.
FIG. 3 is an explanatory diagram of a configuration example of a mode storage section.

FIG. 2 is a state transition diagram between the first mode and the second mode.

As shown in FIG. 2, the first mode ST1 and the second mode ST2 are switched by the user selecting a desired operation mode in the menu screen of the projector 1. Further, when the user holds down the input switching key provided to the operation reception section 21 to perform a change between the video input terminals, the control section 20 switches the set mode of the projector 1 based on the mode correspondence information stored in the mode storage section 22 so that the operation mode corresponding to the video input terminal after the change is set.

The first mode ST1 is also referred to as the fast mode, and is a mode of reducing the delay of the projection image, namely the frame delay, of the projector 1. Specifically, the frame delay is reduced by the video processing section 30 described later using contraction of the image size and doubling of the speed.

The second mode ST2 is also referred to as the fine mode, and is a mode in which the frame delay of the projector 1 occurs, but the quality of the projection image is improved compared to the first mode ST1. Specifically, deterioration of the image quality is suppressed by eliminating the contraction of the image size by the video processing section 30, which is performed in the first mode ST1. In comparison between the first mode ST1 and the second mode ST2, the first mode ST1 is an operation mode giving a higher priority to the reduction of the frame delay than the improvement in the image quality. In contrast, the second mode ST2 is an operation mode giving a higher priority to the improvement in the image quality than the reduction of the frame delay.

The projector 1 can further make the first mode ST1 or the second mode ST2 correspond to each of the plurality of types of the video input terminals (also referred to as "video source types"), and then store the correspondence in the mode storage section 22 using the menu image. Writing and reading of the mode correspondence information to and from the mode storage section 22 are performed by the control section 20. According to this configuration, when the user holds down the input switching key provided to the operation reception section 21 to select the video input terminal (the video source), the control section 20 issues an instruction to the video processing section 30 to switch the operation mode to the first mode ST1 or the second mode ST2 based on the mode correspondence information stored in the mode storage section 22.

FIG. 3 is an explanatory diagram of a configuration example of the mode storage section 22.

In the mode storage section 22 shown in FIG. 3, "ANALOG RGB," "COMPONENT VIDEO," "COMPOSITE VIDEO," "D-VIDEO," and "HDMI (registered trademark) (High-Definition Multimedia Interface)" are displayed as the types of the video input terminals. Further, there is displayed a state in which the "first mode" or the "second mode" is set as the operation mode corresponding to each of the video input terminals.

Going back to FIG. 1, the video processing section 30 is provided with a first video processing section 31 as a first image processing section, a second video processing section 32, a third video processing section 33 as a second image processing section, and so on.

The first video processing section 31 is configured including a first frame memory 31a. The first frame memory 31a corresponds to a first storage section. The frame memory is a memory device for storing the image information of every frame. It should be noted that although in the present embodiment, there is used the first storage section (also, the second storage section) as the frame memory storing the image information of every frame, the frame memory is not limited to this example. For example, the frame memory can also be formed of a plurality of line memories. In the anterior stage of the first video processing section 31, there are disposed the video input terminals (not shown) to which the video information of various types of formats is input from external image supply devices not shown such as a video reproduction device or a personal computer. The video input terminals each correspond to an image input terminal.

The first video processing section 31 selects the video information thus input (i.e., selects the video input terminal) on the basis of the instruction from the control section 20, converts the video information into digital video information, and then stores the digital image information in the first frame memory 31a. It should be noted that the selection of the video information is performed by the user operating the input switching key provided to the operation reception section 21. The operation reception section 21 and the control section 20 on this occasion correspond to an image terminal selection section.

The first video processing section 31 analyzes the video information (the image information) input thereto to thereby determine whether the video information is a 2D-image (2D-video information) or a 3D-image (3D-video information). If the video information input thereto includes control information representing which one of the 2D-image and the 3D-image the video information corresponds to, such determination as described above can be performed. For example, since the HDMI (registered trademark) signal can include such control information as described above, it is possible to determine which one of the 2D-image and the 3D-image the video information corresponds to. The first video processing section 31 notifies the control section 20 of the determination result. In the case of the 3D-image, the control section 20 issues instructions to the first video processing section 31, the second video processing section 32, and the third Video processing section 33 so that the second mode ST2 (the fine mode) is set. It should be noted that the "3D-image" denotes an image for making the user view a stereoscopic image, and an image for expressing a stereoscopic image. As the 3D-image, there can be cited, for example, an image including a right-eye image and a left-eye image. In contrast, the "2D-image" denotes an image for making the user view a planar image, and an image for expressing a planar image.

The first video processing section 31 has a scaler (not shown), and reduces (scales down) the image size (also referred to as "resolution") to roughly a half size in the first mode ST1 (the fast mode) using the first frame memory 31a. Further, in the first mode ST1, the refresh rate of the image information is doubled. In the present embodiment, the image information input with the image size of 1080 p (resolution of 1080 pixels by 1920 pixels) is scaled down to 720 p (resolution of 720 pixels by 1280 pixels). Further, the first video processing section 31 doubles the refresh rate of the image information, which is input with the refresh rate of 60 Hz, to 120 Hz. It should be noted that in the second mode ST2, the first video processing section 31 does not perform the process of scaling down the image size and doubling the refresh rate.

Further, the first video processing section 31 performs a noise reduction process using the first frame memory 31a. Besides the above, the first video processing section 31 performs an adjustment of an image quality such as contrast, sharpness, or color shade.

The second video processing section 32 is configured including a second frame memory 32a. The image information having been processed in the first video processing section 31 is input to the second video processing section 32. In the present embodiment, the image information with the image size of 720 p, and the refresh rate of 120 Hz is input. The second video processing section 32 stores the image information in the second frame memory 32a.

Further, the second video processing section 32 includes the scaler (not shown), but does not perform a scaling process in the present embodiment.

The second video processing section 32 performs video processing such as color management, namely color correction, or a dimming process based on the instruction of the control section 20 using the second frame memory 32a.

The third video processing section 33 is configured including a third frame memory 33a. The third frame memory 33a corresponds to a second storage section. The image information having been processed in the second video processing section 32 is input to the third video processing section 33. In the present embodiment, the image information with the image size of 720 p, and the refresh rate of 120 Hz is input. The third video processing section 33 stores the image information in the third frame memory 33a.

The third video processing section 33 has a scaler (not shown), and scales up the image size to roughly a double size in the case of the first mode ST1 using the third frame memory 33a. Further, the third video processing section 33 doubles the refresh rate of the image information. In the present embodiment, the third video processing section 33 scales up the image information input with the image size of 720 p to 1080 p. Further, the third video processing section 33 doubles the refresh rate of the image information, which is input with the refresh rate of 120 Hz, to 240 Hz.

As described above, it is effective for ensuring the brightness of the image to double the refresh rate in the third video processing section 33. In particular, in the case in which the image information input is a 3D-image (a stereoscopic image), a significant effect is obtained, and therefore, the doubling of the refresh rate is performed. Specifically, in the case of viewing the 3D-image using a pair of 3D-active shutter glasses, it becomes possible to inhibit the brightness of the viewed image from decreasing. Further, in the case of the 2D-image, it is also possible to improve the brightness by raising the refresh rate.

It should be noted that in the second mode ST2, the third video processing section 33 does not perform the process of scaling up the image size.

Further, the third video processing section 33 performs image processing such as a keystone distortion correction process (also referred to as a "keystone process") using the third frame memory 33a. Here, the keystone distortion correction process denotes a process of correcting the image information in order to suppress the distortion (the keystone distortion) in which the projection image is enlarged in the direction of the tilt in the case of projecting the image in the state in which the projector 1 is tilted with respect to the projection surface S.

Figure 4A:
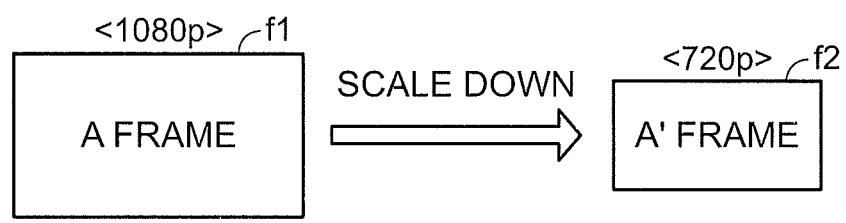
Figure 4B:
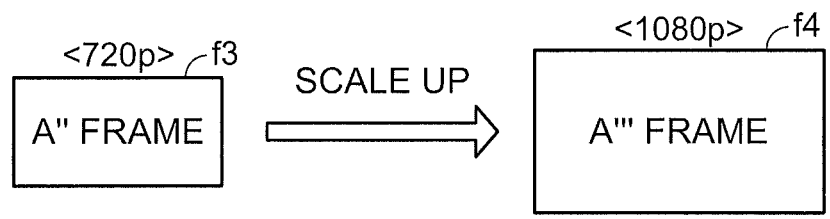

Here, the scale-down process and the scale-up process performed by the scaler will be explained. FIGS. 4A and 4B are explanatory diagrams of scaling performed by the scaler, wherein FIG. 4A is an explanatory diagram of the scale-down process, and FIG. 4B is an explanatory diagram of the scale-up process.

FIG. 4A shows a frame (image information) obtained by the first video processing section 31 scaling down the image size from 1080 p to 720 p. On this occasion, in the scale-down process, by performing thinning of the pixel values on the image information (an A frame) f1 with the size of 1080 p, the image information (an A' frame) f2 with the size of 720 p is generated.

FIG. 4B shows a frame (image information) obtained by the third video processing section 33 scaling up the image size from 720 p to 1080 p. On this occasion, in the scale-up process, by performing interpolation of the pixel values on the image information (an A" frame) f3 with the size of 720 p, the image information (an A'" frame) f4 with the size of 1080 p is generated.

Further, the frame delay of the image information in the first video processing section 31, the second video processing section 32, and the third video processing section 33 will be explained.

Figure 5:
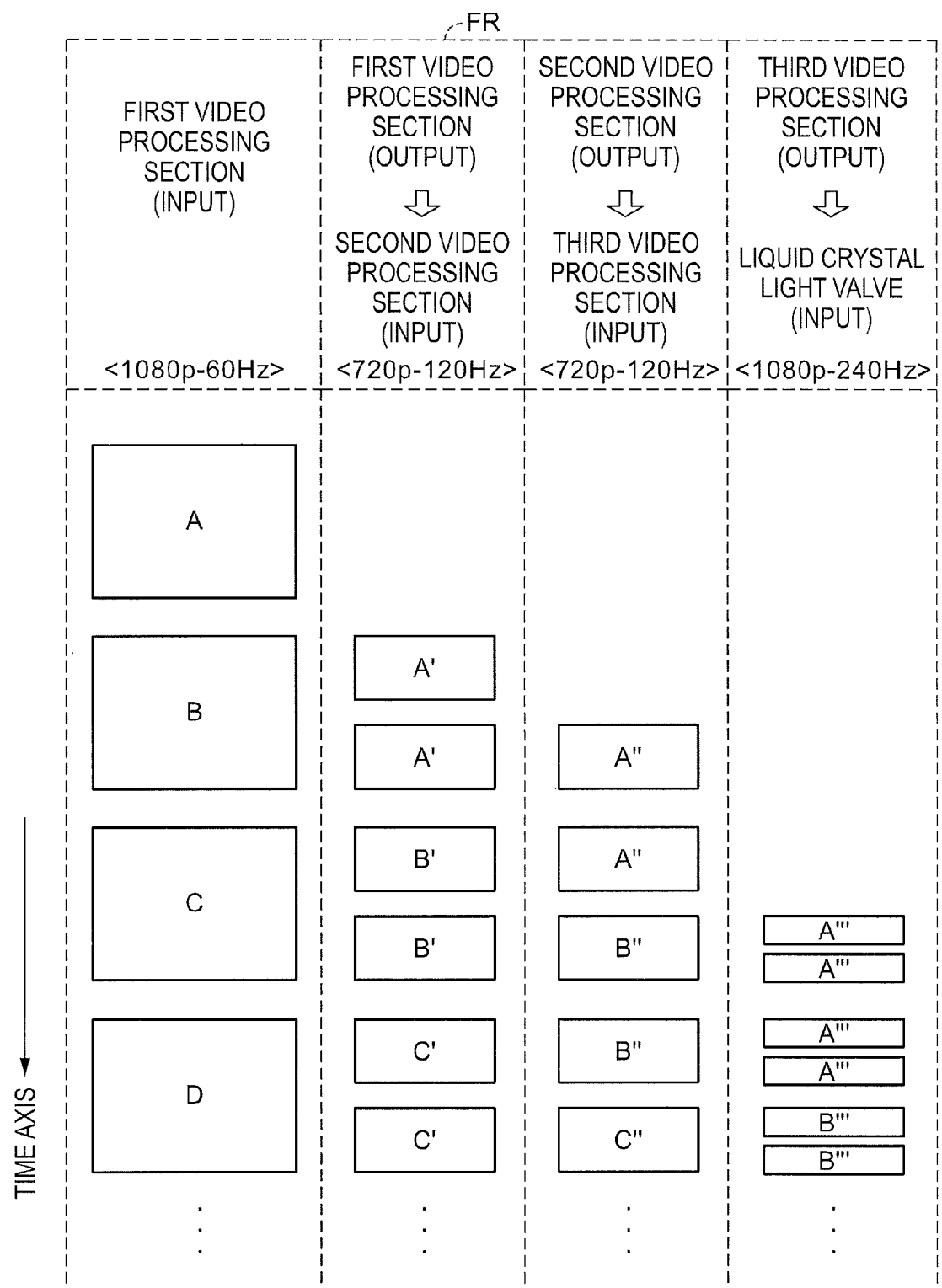
FIG. 5 is an explanatory diagram of the frame delay of image information in a first video processing section, a second video processing section, and a third video processing section.

FIG. 5 is an explanatory diagram of the frame delay of the image information in the first video processing section 31, the second video processing section 32, and the third video processing section 33. It should be noted that the size of the rectangle representing the frame on the table FR shown in FIG. 5 does not represent the image size. The table FR shows the timing of the frame delay in the first video processing section 31, the second video processing section 32, and the third video processing section 33. In the table FR, the vertical direction represents the time axis.

As shown in FIG. 5, the image information of 1080 p-60 Hz is input to the first video processing section 31 in the order of A frame, B frame, C frame, D frame, . . . . Here, "1080 p-60 Hz" denotes the fact that the image size (the resolution) of the image information is 1080 p, and the refresh rate thereof is 60 Hz, and in the following explanation, the image size and the refresh rate of the image information are expressed in such a manner as described above in some cases. The first video processing section 31 stores the frame input thereto in the first frame memory 31a in series. The first video processing section 31 generates the image information of 720 p-120 Hz from the image information of 1080 p-60 Hz, and performs the image processing to output the image information two frames at a time (A' frame, A' frame, B' frame, B' frame, C' frame, C' frame, . . . ).

The second video processing section 32 stores the image information of 720 p-120 Hz input thereto in the second frame memory 32a in series. The second video processing section 32 performs the image processing on the image information of 720 p-120 Hz with the same image size and the same refresh rate to output the image information two frames at a time (A" frame, A" frame, B" frame, B" frame, C" frame, C" frame, . . . ).

The third video processing section 33 stores the image information of 720 p-120 Hz input thereto in the third frame memory 33a in series. The third video processing section 33 generates the image information of 1080 p-240 Hz from the image information of 720 p-120 Hz, and performs the image processing to output the image information four frames at a time (A'" frame, A'" frame, A'" frame, A'" frame, B'" frame, B'" frame, B'" frame, B'" frame, C'" frame, C'" frame, C'" frame, C'" frame, . . . ).

As described above, in the present embodiment, the image information input thereto is delayed as much as one frame in the first video processing section 31, and is then delayed as much as 0.5 frame in the second video processing section 32, and is then delayed as much as one frame in the third video processing section 33. The sum of these delays is 2.5 frame. Here, if the scale-down process of the image size is not performed, the delay as much as one frame occurs in the first video processing section 31, the delay as much as one frame occurs in the second video processing section 32, and the delay as much as two frames occurs in the third video processing section 33. In this case, the sum of the delays is four frames. Therefore, in the present embodiment, it results that the frame delay as much as 1.5 frame is reduced.

Going back to FIG. 1, the image information output from the third video processing section 33, namely the video processing section 30, is input to the liquid crystal drive section 14.

The liquid crystal drive section 14 drives the liquid crystal light valves 12R, 12G, and 12B in accordance with the image information input from the video processing section 30. Thus, the light emitted from the light source device 11 is modulated by the liquid crystal light valves 12R, 12G, and 12B in accordance with the image information, and is then projected through the projection lens 13.

According to the embodiment described above, the following advantages can be obtained.

1. The first video processing section 31, the second video processing section 32, and the third video processing section 33 of the projector 1 each have the frame memory, and store the image information. Further, the first video processing section 31 scales down the image size of the image information to roughly a half size, and doubles the refresh rate. The third video processing section 33 performs the process of scaling up the image size of the image information to roughly a double size. In other words, since the first video processing section 31 scales down the image size of the image information, it becomes possible to reduce the frame delay in writing/reading to/from the frame memory and the image processing performed thereafter. Then, the third video processing section 33 scales up the image size having been contracted. Therefore, it becomes possible to restore the image size at input, and output the image for display while reducing the frame delay, which is advantageous. Further, according to such a process of the video processing section 30, there is not required a measure for speeding up the dot clock for the image processing or a measure for expanding the bus width. In other words, since it is possible to avoid speeding up the device or expanding the wiring area, it becomes possible to inhibit the rise in manufacturing cost, which is advantageous.

2. It is possible for the projector 1 to switch between the first mode ST1 (the fast mode) and the second mode ST2 (the fine mode) in response to the user performing the setting with the menu image. Thus, it becomes possible for the user to switch between the first mode ST1 for reducing the frame delay (the image delay time) and the second mode ST2 for preventing the image quality from degrading in accordance with the picture viewed by the user, and therefore, the convenience is enhanced. It becomes possible to select the first mode ST1 in the case of, for example, projecting a picture of a video game requiring the real-time processing as an important factor, and select the second mode ST2 in the case of projecting a picture such as a movie.

3. It is possible for the mode storage section 22 of the projector 1 to store the correspondence between each of the video input terminals and either one of the first mode ST1 and the second mode ST2. The control section 20 switches the operation mode to one of the first mode ST1 and the second mode ST2 based on the type of the video input terminal selected by the user and the mode correspondence information stored in the mode storage section 22. Thus, it becomes possible to automatically switch between the first mode ST1 for reducing the frame delay and the second mode ST2 for preventing the image quality from degrading in accordance with the video input terminal, and therefore, the convenience is enhanced. It becomes possible for, for example, the user who performs a game with a gaming machine always connected to the HDMI® terminal to set the operation mode corresponding to the HDMI® terminal to the first mode to thereby reduce the trouble of manually switching the setting mode.

4. In the projector 1, in the case in which the video information input thereto is a 3D-image (3D-image information), the control section 20 switches the operation mode to the second mode ST2 (the fine mode). Thus, it becomes possible to avoid potential image quality deterioration caused by a 3D-video system. It is advantageous in the case in which, for example, the 3D-video system is a side-by-side system.

5. In the projector 1, in the case in which the video information input thereto is a 3D-image (3D-image information), the third video processing section 33 doubles the refresh rate of the image information to be output therefrom. Thus, it becomes possible to inhibit the brightness of the viewed image from decreasing when the user views the 3D-image using a pair of 3D-active shutter glasses, which is advantageous. Specifically, since the time period during which the pair of active shutter glasses are closed is reduced by doubling the refresh rate, it becomes possible to increase the brightness of the viewed image compared to the case in which the refresh rate is not doubled. Further, in the case of the 2D-image, it is also possible for the third video processing section 33 to double the refresh rate of the image information to be output therefrom.

It should be noted that the invention is not limited to the embodiment described above, but can be put into practice with various modifications or improvements. Some modified examples will be described below.

MODIFIED EXAMPLE 1

In the embodiment described above, it is assumed that in the first video processing section 31, the noise reduction process and the image quality adjustment are performed as the image processing. It is assumed that in the second video processing section 32, the color management and the dimming process are performed as the image processing. Further, it is assumed that in the third video processing section 33, the keystone correction process is performed as the image processing. However, the image processing performed in the first video processing section 31, the second video processing section 32, and the third video processing section 33 is not limited to these processes, and other image processing can also be performed.

MODIFIED EXAMPLE 2

Although it is assumed that in the embodiment described above, the video processing section 30 includes the first video processing section 31, the second video processing section 32, and the third video processing section 33, the number of the processing sections is not limited to three providing the number is plural.

MODIFIED EXAMPLE 3

Although it is assumed that in the present embodiment, the third video processing section 33 doubles the refresh rate of the image information, it is not necessarily required to double the refresh rate in the case of the 2D-image.

MODIFIED EXAMPLE 4

Although in the embodiment described above, it is assumed that the picture (the image) input thereto has the image size of 1080 p, and the refresh rate of 60 Hz, the invention is not limited to this example. The image size and the refresh rate can be different from these values. Further, although in the embodiment described above, the image size is scaled down from 1080 p to 720 p, the degree of scaling down is not limited to this example.

MODIFIED EXAMPLE 5

Although in the embodiments described above, the explanation is presented citing the projectors 1 as an example of the image display device having the image processing device, the image display device is not limited to the projector. It is also possible to apply the invention to, for example, a rear projector integrally provided with a transmissive screen, a liquid crystal display, a plasma display, an organic electroluminescence (EL) display, and a television receiver.

MODIFIED EXAMPLE 6

Although in the embodiment described above, the light source device 11 is configured including the discharge light source lamp 11a, a sold-state light source such as alight emitting diode (LED) light source or a laser, or other light sources can also be used therefor.

MODIFIED EXAMPLE 7

Although in the embodiment described above the projector 1 uses the transmissive liquid crystal light valves 12R, 12G, and 12B as the light modulation device, it is also possible to use a reflective light modulation device such as reflective liquid crystal light valves. Further, a micromirror array device for modulating the light emitted from the light source by controlling the emission direction of the incident light for every micromirror as a pixel can also be used as the light modulation device.

What is claimed is:

1. An image processing device adapted to perform image processing on image information input, and then output the image information, the image processing device comprising:
    a central processing unit adapted to perform as:
    a first image processing section adapted to perform image processing on the image information, and include a first storage section to store the image information;
    a second image processing section adapted to perform image processing on the image information from the first image processing section, and include a second storage section, separate from the first storage section to store the image information; and
    a third image processing section adapted to perform image processing on the image information after the processing of the first image processing section, but before the processing of second image processing section, the third image processing section including a third storage section, separate from the first and second storage sections, to store the image information, the third image processing section performing video processing of color correction or dimming using the third image processing section;
    a control section adapted to switch between
    a first mode for performing a process of reducing the image size of the image information and raising the refresh rate of the image information by the first image processing section, and a process of enlarging the image size of the image information by the second image processing section, and
    a second mode for keeping unchanged the image size and the refresh rate of the image information in the first image processing section, and keeping unchanged the image size of the image information also in the second image processing section,
    wherein the first image processing section performs a process of reducing an image size of the image information stored in the first storage section and raising a refresh rate,
    wherein the second image processing section performs a process of enlarging an image size of the image information stored in the second storage section;
    a plurality of image input terminals; and
    a mode storage section adapted to store mode correspondence information indicating a correspondence between at least one of the image input terminals and one of the first mode and the second mode,
    wherein the central processing unit is further adapted to perform as an image terminal selection section adapted to select one of the image input terminals,
    wherein the control section selects one of the first mode and the second mode based on information of the image input terminal selected by the image terminal selection section, and the mode correspondence information stored in the mode storage section, and
    wherein in the mode storage section at least one of ANALOG RGB, COMPONENT VIDEO, and COMPOSITE VIDEO, and at least one of D-VIDEO and HDMI are stored as types of the image input terminals, at least one of D-VIDEO and HDMI has an operation mode set to the first mode, and at least one of ANALOG RGB, COMPONENT VIDEO and COMPOSITE VIDEO has an operation mode set to the second mode.

2. The image processing device according to claim 1, wherein
    in a case in which the image information input is 3D-image information, the control section performs switching to the second mode.

3. The image processing device according to claim 1, wherein
    in a case in which the image information input is 3D-image information, the second image processing section performs a process of raising the refresh rate of the image information input to the second image processing section, and then outputs the image information.

4. An image display device comprising:
    an image processing device adapted to perform image processing on image information input, and then output the image information; and
    a display section adapted to display an image based on the image information processed by the image processing device, wherein the image processing device includes
a central processing unit adapted to perform as:
a first image processing section adapted to perform image processing on the image information, and include a first storage section to store the image information,
a second image processing section adapted to perform image processing on the image information from the first image processing section, and include a second storage section, separate from the first storage section, to store the image information, and
a third image processing section adapted to perform image processing on the image information after the processing of the first image processing section, but before the processing of the second image processing section, the third image processing section including a third storage section, separate from the first and second storage sections, to store the image information, the third image processing section performing video processing of color correction or dimming using the third image processing section;
a control section adapted to switch between
a first mode for performing a process of reducing the image size of the image information and raising the refresh rate of the image information by the first image processing section, and a process of enlarging the image size of the image information by the second image processing section, and
a second mode for keeping unchanged the image size and the refresh rate of the image information in the first image processing section, and keeping unchanged the image size of the image information also in the second image processing section,
wherein the first image processing section performs a process of reducing an image size of the image information stored in the first storage section and raising a refresh rate,
wherein the second image processing section performs a process of enlarging an image size of the image information stored in the second storage section;
a plurality of image input terminals; and
a mode storage section adapted to store mode correspondence information indicating a correspondence between at least one of the image input terminals and one of the first mode and the second mode;
wherein the central processing unit is further adapted to perform as an image terminal selection section adapted to select one of the image input terminals, and
wherein the control section selects one of the first mode and the second mode based on information of the image input terminal selected by the image terminal selection section, and the mode correspondence information stored in the mode storage section, and
wherein in the mode storage section at least one of ANALOG RGB, COMPONENT VIDEO, and COMPOSITE VIDEO, and at least one of D-VIDEO and HDMI are stored as types of the image input terminals, at least one of D-VIDEO and HDMI has an operation mode set to the first mode, and at least one of ANALOG RGB, COMPONENT VIDEO and COMPOSITE VIDEO has an operation mode set to the second mode.

5. The image display device according to claim 4, wherein in a case in which the image information input is 3D-image information, the control section performs switching to the second mode.

6. The image display device according to claim 4, wherein in a case in which the image information input is 3D-image information, the second image processing section performs a process of raising the refresh rate of the image information input to the second image processing section, and then outputs the image information.

7. A method of controlling an image processing device including a first image processing section adapted to perform image processing on the image information, and include a first storage section to store the image information, a second image processing section adapted to perform image processing on the image information from the first image processing section, and include a second storage section, separate from the first storage section, to store the image information, and adapted to perform image processing on image information input and then output the image information, and a third image processing section adapted to perform image processing on the image information after the processing of the first image processing section, but before the processing of the second image processing section, the third image processing section including a third storage section, separate from the first and second storage sections, to store the image information, the method comprising:
reducing an image size of the image information stored in the first storage section and raising a refresh rate by the first image processing section;
enlarging an image size of the image information stored in the second storage section by the second image processing section; and
performing video processing of color correction or dimming using the third image processing section;
switching between
(i) a first mode for performing a process of reducing the image size of the image information and raising the refresh rate of the image information by the first image processing section, and a process of enlarging the image size of the image information by the second image processing section, and
(ii) a second mode for keeping unchanged the image size and the refresh rate of the image information in the first image processing section, and keeping unchanged the image size of the image information also in the second image processing section;
selecting one of image input terminals,
wherein in the switching, one of the first mode and the second mode is selected based on information of the image input terminal selected in the selecting, and mode correspondence information indicating a correspondence between at least one of the image input terminals and one of the first mode and the second mode, and
wherein at least one of ANALOG RGB, COMPONENT VIDEO, and COMPOSITE VIDEO, and at least one of D-VIDEO and HDMI are stored as types of the image input terminals, at least one of D-VIDEO and HDMI has an operation mode set to the first mode, and at least one of ANALOG RGB, COMPONENT VIDEO and COMPOSITE VIDEO has an operation mode set to the second mode.

8. The method of controlling an image processing device according to claim 7, wherein
in a case in which the image information input is 3D-image information, switching to the second mode is performed in the switching.

9. The method of controlling an image processing device according to claim 7, wherein
in a case in which the image information input is 3D-image information, a process of raising the refresh rate of the image information input to the second image processing section is performed, and then the image information is output in the enlarging.

* * * * *